May 26, 1959 E. P. SAPER 2,888,547
PORTABLE IMMERSION ELECTRIC LIQUID HEATER
Filed June 19, 1958
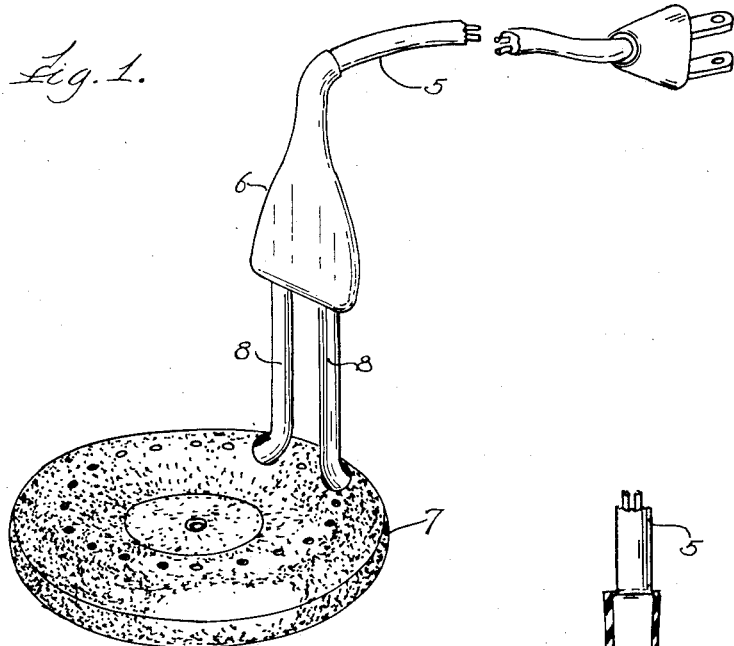
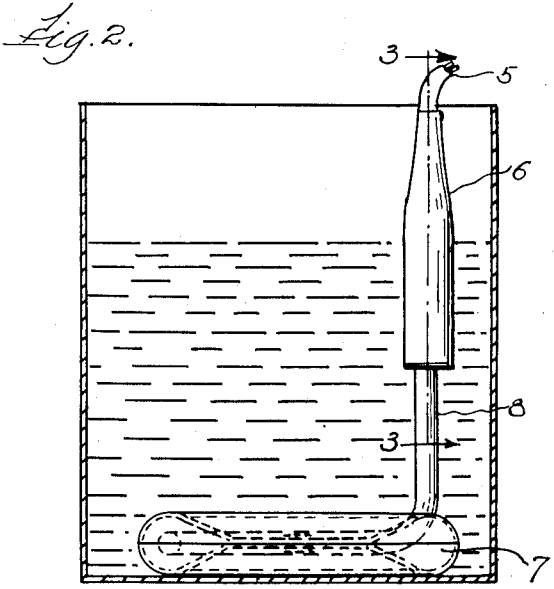
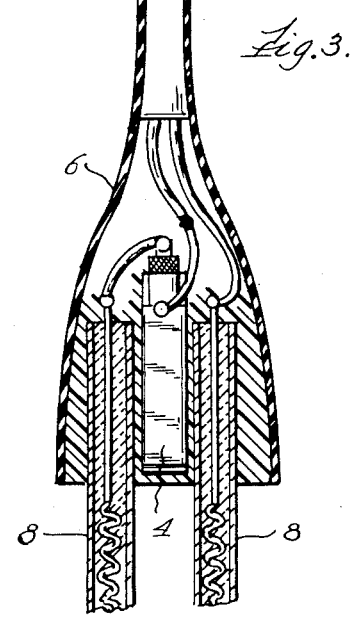
INVENTOR.
Earl P. Saper,
BY
Earl P. Saper

2,888,547
PORTABLE IMMERSION ELECTRIC LIQUID HEATER

Earl P. Saper, Chicago, Ill.

Application June 19, 1958, Serial No. 743,136

4 Claims. (Cl. 219—41)

My invention relates in general to heaters and more particularly to heaters used to heat liquids or for heating in atmospheres where moisture is a problem.

An object of my invention is to provide a waterproof junction at the point where the source of electrical current is connected to the electrically-energized terminals of a metal-sheathed heating element in order to form a totally-insulated, waterproof, liquid heater which may be completely immersed within a liquid without becoming a potential shock hazard to the user.

Another object of my invention is to provide a moisture-proof seal at the point where the source of electrical current is connected to the electrically-energized terminals of a metal-sheathed heating element in order to form a totally-insulated, waterproof heater which may be used in moist atmospheres without affecting the insulation properties or serviceable life of the heater.

Other objects and a fuller understanding of the invention may be had by referring to the following description and claims, taken in conjunction with the accompanying drawings in which:

Fig. 1 shows a perspective of a water heater in which the invention may be incorporated;

Fig. 2 is a side elevation of this water heater submerged in a container of water; and Fig. 3 is an enlarged detail section of the electrical connections made in this heater, as viewed through line 3—3 on Fig. 2.

With reference to the drawing, the invention is illustrated as in Fig. 2, a totally-insulated heater placed within a container of water. The four main components of this heater are the heating element 8, the thermostat 4, the holder 6 and the flexible cord set 5. The metal-sheathed heating element 8 is of the type commonly used in many heating applications, consisting basically of, a heater wire suspended within a round metal case and filled solidly with a heat-conducting, electrically-insulating powder so that no part of the heater wire comes into contact with the metal case. The heating element has two terminals for the electrical connection. In this application, the metal-sheathed heating element 8 has been formed so as to fit a round metal enclosure 7. This enclosure is used for decorative purposes and to provide a more effective position for the metal-sheathed heating element 8, whose ends are seen emerging from the enclosure in Fig. 1. The thermostat 4, of a type commonly used in many heating applications and having two terminals for the electrical connection, has been incorporated in Fig. 3. A cord set 5, of the type commonly used in many electrical applications and having two terminals for the electrical connection, completes the electrically-energized components of this invention. One terminal of the heating element 8 is connected to one terminal of the cord set 5; the second terminal of the heating element 8 is connected to one terminal of the thermostat 4; and the second terminal of the thermostat 4 is connected to the second terminal of the cord set 5. All electrically-energized parts of these components are, in themselves, insulated from their non-electrically energized parts. However, unless an insulated, waterproof enclosure is provided at the point where the electrical connections are made, immersion of the heater at this point would cause the heater to become a potential shock hazard to a user who may come into contact with the liquid. The heat-conducting, electrically-insulated powder used to insulate the metal case of the heating element from its heater wire, has a tendency to absorb moisture. Moisture ruins the insulation properties of these heaters and causes deterioration of electrically-energized parts through the process of electrolysis. Therefore, not only is it necessary to insulate electrically-energized parts, but a seal is usually provided to guard against moisture absorption. The fact that the ends of the heating element are hot during operation, makes it necessary that this seal be not only moisture-proof or waterproof, but it also must be able to withstand the high temperatures to which the element may subject it.

My invention accomplishes this in the following manner: a holder 6, which may be metal or non-metallic, encompassing all electrically-energized, non-insulated parts, is provided, into which an insulating epoxy resin is cast. Epoxy resin involves the mixing of two components—a resin and a hardener. No chemical action takes place until the two are mixed. The proportion of resin and hardener varies in different epoxies and depends on the chemical manufacturer and/or the characteristics to be obtained. In this application equal portions, by weight, of resin and hardener are used. Once the two components are mixed, the mixture is poured into a holder 6 and the casting hardens without the addition of heat. Epoxy resins differ from plastic resins such as "plastisols" since the former when once cast requires no outside source of heat whereas the latter is a one component material that hardens only with the application of high heat, usually at least 350° F. Another difference is that epoxy resins, because they are cast, give a thick amount of insulation with one casting, whereas plastisols give only a coating. This means that for thick sections, coatings must be built up one at a time. Finally, epoxides, when hardened are rock-hard and rigid, whereas plastics used for water-proofing are usually, "rubber-like." Such rigidity affords a definite advantage in portable devices since they are often subjected to rough handling. Also this resin is waterproof, adheres to both metals and non-metals and is not affected by the operating heating element sheath temperature. As in Fig. 1, the holder 6 may take such form as to be used as a handle in the handling of the heater.

The necessity of such a totally-insulated heater in heating liquids or where used in moist atmospheres, is well known. Because it was difficult to provide a completely waterproof, high temperature resistant junction, many previous heaters were forced to be overly large and cumbersome so the point where the electrical connections were made was, of necessity, kept out of the liquid. In those cases where a thermostat was used, very often the effectiveness of the thermostat was impaired because it had to be kept out of the liquid it was heating. With my invention, the heating element need only be of a length to insure long life when used within the liquid, and the thermostat can be placed in the most effective location. Other heaters have used different methods to obtain a waterproof, high temperature resistant, totally-insulated junction where the electrical connections are made, but my method has certain advantages over those now existing. Because of the high temperature involved, most similar heaters use ceramic casting, or molding of plastic or rubber, for the insulation of electrically-energized parts. Ceramic castings are generally porous and must be subjected to additional treatment in order to make them moisture-resistant; even then, their waterproof characteristics are not as good as epoxy. Molding plastic or rubber, which have the necessary moisture-proof and waterproof characteristics, require the use of permanent, generally expensive molds and the use of pressure and elevated temperatures to properly cure. The pressure most likely will change the setting of the thermostat. The elevated temperatures sometimes affect parts of thermostat and, unless restricted to the part being cured, can cause the cord to disintegrate. In my invention these objections are overcome since the epoxy resin is cast and no pressure is required during the curing process. After a period of time, at room temperature, the resin becomes completely hardened and encapsulates the electrically-energized, non-insulated parts, in a waterproof, high temperature resistant, totally-insulated housing. This process lends itself to a low-cost, easily adaptable method of making a waterproof, insulated junction since the holder 6 may be of any material and may either remain as part of the appliance or it may be removed after curing.

Where it is not necessary, the thermostat 4 is eliminated.

Although I have described my invention with a certain degree of particularity, it is understood that the present disclosure has been made only by way of example and that changes in details of construction and the combination and arrangement of parts may be resorted to without departing from the spirit and scope of the invention as hereinafter claimed.

I claim as my invention:

1. In a liquid heater comprising, in combination, a thermostat actuated by a metal-sheathed heating element and both being energized by a source of current from a flexible cord set, said improvement comprising of an encapsulation of electrically-energized parts in a high temperature resistant, insulating, epoxy resin, which is cast and solidifies at normal room temperature, to provide a waterproof junction so that the entire heater can be immersed directly in a liquid without causing a potential shock hazard to the user.

2. In a heater comprising, in combination, a thermostat actuated by a metal-sheathed heating element and both being energized by a source of current from a flexible cord set, said improvement comprising of an encapsulation of electrically-energized parts in a high temperature resistant, insulating, epoxy resin, which is cast and solidifies at room temperatures, to provide a low-cost method which could be adapted to the manufacture of waterproof or moisture-proof junctions without the use of costly, permanent molds.

3. In a liquid heater comprising, in combination, a metal-sheathed heating element energized by a source of current from a flexible cord set, said improvement comprising of an encapsulation of electrically-energized parts in a high temperature resistant, insulating, epoxy resin, which is cast and solidifies at normal room temperature, to provide a waterproof junction so that the entire heater can be immersed directly in a liquid without causing a potential shock hazard to the user.

4. In a heater comprising, in combination, a metal-sheathed heating element energized by a source of current from a flexible cord set, said improvement comprising of an encapsulation of electrically-energized parts in a high temperature resistant, insulating, epoxy resin, which is cast and solidifies at room temperatures, to provide a low-cost method which could be adapted to the manufacture of waterproof or moisture-proof junctions without the use of costly, permanent molds.

References Cited in the file of this patent

UNITED STATES PATENTS

| 2,740,881 | Strokes | Apr. 3, 1956 |
| 2,816,207 | Boggs | Dec. 10, 1957 |